United States Patent [19]

Blanchard et al.

[11] Patent Number: 5,409,878

[45] Date of Patent: Apr. 25, 1995

[54] NON SELECTIVE OXIDATION CATALYST AND METHOD OF PREPARATION

[75] Inventors: Luc Blanchard, Enghien-les-Bains; Patrick Briot, Vienne; Michel Primet, Rillieux la Pape; Edouard Garbowski, Villeurbanne, all of France

[73] Assignee: Gaz de France, Paris, France

[21] Appl. No.: 956,498

[22] PCT Filed: May 6, 1992

[86] PCT No.: PCT/FR92/00413

§ 371 Date: Mar. 2, 1993

§ 102(e) Date: Mar. 2, 1993

[87] PCT Pub. No.: WO92/19375

PCT Pub. Date: Nov. 12, 1992

[30] Foreign Application Priority Data

May 6, 1991 [FR] France .................. 91 05517

[51] Int. Cl.$^6$ .............................................. B01J 21/04
[52] U.S. Cl. ..................................... 502/262; 502/500
[58] Field of Search ............................. 502/262, 500

[56] References Cited

U.S. PATENT DOCUMENTS

| | | | |
|---|---|---|---|
| 4,014,948 | 3/1977 | Myers | 260/666 P |
| 4,064,154 | 12/1977 | Chandra et al. | 260/448.2 E |
| 4,507,401 | 3/1985 | Dubois et al. | 502/242 |
| 4,677,095 | 6/1987 | Wan et al. | 502/262 |
| 4,766,101 | 8/1988 | Nortier et al. | 502/164 |

FOREIGN PATENT DOCUMENTS

| | | | |
|---|---|---|---|
| 0115107 | 5/1942 | Australia | 502/262 |
| 0190883 | 8/1986 | European Pat. Off. | |
| 2249852 | 5/1975 | France | |
| 0099340 | 7/1980 | Japan | 502/262 |
| 3209751 | 8/1988 | Japan | 502/262 |
| 1492274 | 11/1977 | United Kingdom | |
| 2246524 | 2/1992 | United Kingdom | 502/262 |

*Primary Examiner*—Asok Pal
*Attorney, Agent, or Firm*—Steinberg, Raskin & Davidson

[57] ABSTRACT

The present invention concerns a non selective oxidation catalyst resistant to high temperatures and a method of preparation of this catalyst.

According to the invention, this catalyst comprises an essentially alumina-based support stabilized with silicon and a precursor of the active phase consisting of a noble metal M in which the active phase is cationic aminocomplex of the $[M(NH_3)_4]^{++}$ type or a compound selected among the tetrachloropalladic acid.

The catalyst of the invention is usable in particular in processes of catalytic combustion of hydrocarbons, of carbone monoxide, of hydrogen or of their mixtures.

8 Claims, 4 Drawing Sheets

NON SELECTIVE OXIDATION CATALYST AND METHOD OF PREPARATION

The present invention relates to non selective oxidation catalysts withstanding high temperatures, a method of preparation of these catalysts and their use for the catalytic combustion of the hydrocarbons, of the carbon monoxide, of the hydrogen and of their mixtures.

The combustion usually utilized in the processes of combustion of hydrocarbons such as methane produces nitrogen oxides $NO_x$, carbon monoxide CO and unburnt residue. On the contrary the catalytic combustion also called "flameless" combustion produces little pollutants such as $NO_x$ and CO. This catalytic combustion moreover is of a more flexible utilization and may be carried out in explosive atmospheres.

The commonly used catalysts consist of a support made from an oxide of refractory metals of small specific surface upon which is deposited a fine alumina coating. The presence of a fine alumina coating allows to deposit the active phase consisting of noble metals in a state of high dispersion.

But it has turned out that in the course of the utilization of such catalysts at high temperatures, the catalyst undergoes a degradation thus decreasing the catalytic performances. Among the causes generally contemplated to account for this deterioration of the catalyst, one may note the decrease of the number of active centers bound to an increase of the size of the metallic particles because of the high temperatures, of the presence of water and of oxygen.

Another cause justifying the degradation of the catalyst is a decrease of the specific surface area of the alumina also called sintering with its conversion into the alpha variety. This decrease of the specific surface area may both lead to an encapsulation of the metallic particles as well as to an exaltation of the sintering of the active phase.

Thus in order to limit this loss of the specific surface of the alumina, it has been proposed to add to the support comprising the alumina stabilizers in the course of the preparation.

Among these stabilizers, one may cite elements such as oxides of rare earths, essentially cerium and lanthanum, of zirconium, of baryum or of silicon.

The silicon is a particularly effective stabilizer. There has already been proposed to add to the alumina various silicon-based compounds in order to improve the stability of the support in alumina with respect to the thermal sintering. Thus it is known to add:
  compounds of the alkoxysilicon type as described in the U.S. Pat. No. 1,492,274 and in the French patent No. 2,249,852,
  a polysiloxane as described in the European patent application No. 190,883,
  a quaternary ammonium silicate as described in the European patent application No. 184,506,
  silicon in the form of microballs of colloidal silica as described in the document W. R. SYMES and E. RASTETTER, 24th International Colloquium on Refractories, Aachen.

Furthermore within the scope of the catalytic combustion it is known to introduce a noble metal from the platinum group on an alumina support stabilized by silicon.

Now the introduction of noble metals in a high dispersion state on a stabilized support assumes a strong interaction between the functional groupings of the support and the precursor of the active phase. This interaction depends essentially of the nature of these functional groupings. In the case of a stabilized alumina support, the hydroxyl groupings of the surface of the support are capable of reacting with precursors of the active phase in order to iramobilize this active phase on the surface of the support.

Therefore the interaction between the hydroxyl groupings present at the surface of the support and the precursor of the active surface is a function of the nature of these hydroxyl groupings and of their acidobasic character.

The present invention has therefore as its object to adapt the nature of the precursor of the active phase to the reactivity of the hydroxyl groupings present at the surface of the support in order to improve the interaction between these hydroxyl groupings and the precursor of the active phase.

This goal is reached with the catalyst according to the invention which comprises a support essentially based on alumina stabilized by silicon and a precursor of the active phase consisting of a noble metal M, the catalyst is characterized in that the said precursor of the active phase is selected among a cationic amino-complex with the formula $[M(NH_3)_4]^{++}$, and the tetrachloropalladic acid.

According to other characteristics of the catalyst of the present invention:
  the aforesaid support is stabilized with tetra-ethoxysilicon;
  the noble metal M is palladium or platinum;
  the noble metal content is comprised between 0.1% and 1% by weight;
  the noble metal content is of the order of 0.5% by weight.

The catalyst according to the invention is obtained according to a method of preparation which consists in stabilizing the support essentially of alumina in at least one step by the grafting of a compound selected among the alkylated orthosilicates so that the hydroxyl groupings present on the support surface consist essentially of SiOH groupings and in subjecting the said support thus stabilized to a cationic exchange with the amino-complex.

The invention aims also at the utilization of the catalyst hereabove for the combustion of hydrocarbons, of carbon monoxide, of hydrogen or of their mixtures.

Further objects, characteristics and advantages of the present invention will appear more clearly when reading the detailed description which will follow.

The catalysts of the present invention essentially comprise a support consisting of gamma alumina stabilized with silicon and an active phase precursor deposited upon the said support and consisting of a noble metal M, the said precursor being of the cationic aminocomplex type of the formula $[M(NH_3)_4]^{++}$, hexachloro-platinic acid or tetrachloropalladic acid.

A) Preparation of the alumina support stabilized with silicon

The alumina support stabilized with silicon may be prepared according to the following grafting method:

The alumina support is an alumina of the SCM 129 gamma type manufactured by RHONE-POULENC and having a specific surface area of 107 $m^2/g$.

50 g of alumina of the SCM 129 gamma type are put in suspension within 200 ml of ethanol. In this suspension one casts a volume of an ethanolic solution of tetraethoxysilicon $(Si(OEt)_4)$ with a concentration of tetraethoxysilicon such that the support obtained has a silicon concentration lying between 1% and 4% by weight. The alumina, ethanol, tetraethoxysilicon system is maintained for 1 hour under stirring at a temperature of 60° C. The ethanol is then removed by evaporation under a reduced pressure. The solid obtained is dried at a temperature of 110° C. for one night, then calcined under a flux of oxygen up to 150° C. with a slow rise in temperature of 1° C./mn. During this slow rise, the non-grafted tetraethoxysilicon is removed through vaporization whereas the hydrocarbonic groupings of the grafted portion are oxidized into water and carbon dioxide.

This method of grafting allows to graft in one single time up to 2% by weight of silicon with respect to alumina. Higher contents lying between 2% and 7% by weight and more particularly of 3.16% by weight may be obtained by carrying out a second grafting of the tetraethoxysilicon on an alumina support already containing about 2% by weight of silicon and which is calcined under oxygen up to 500° C. before the second treatment by tetraethoxysilicon.

A study made through infrared spectrometry has allowed to determine the nature of the groupings present at the surface of the alumina support stabilized by the silicon.

Figure 2:
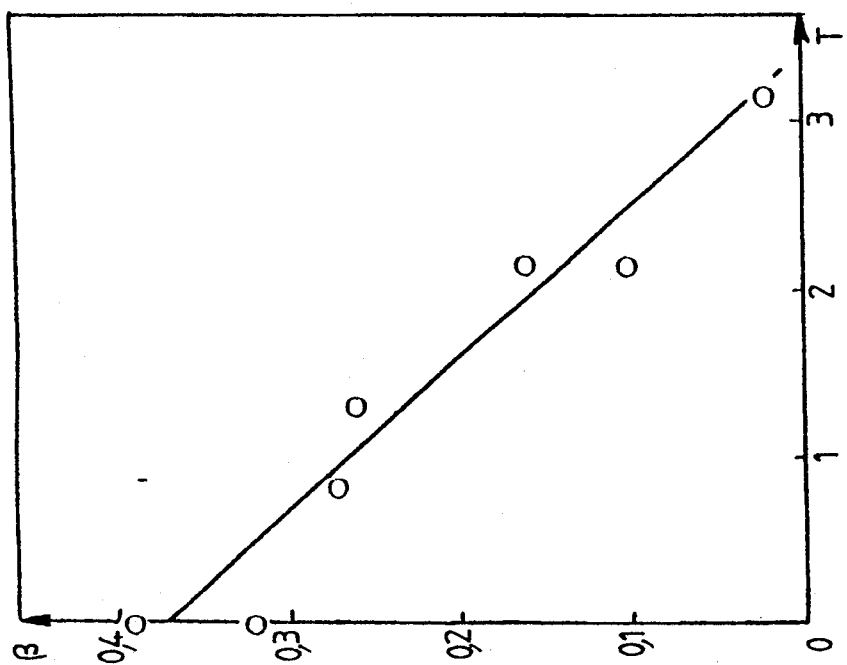
FIG. 2 shows the evolution of the ratio $\beta$ of the aluminas stabilized by the silicon as a function of the silicon content T.
Figure 1:
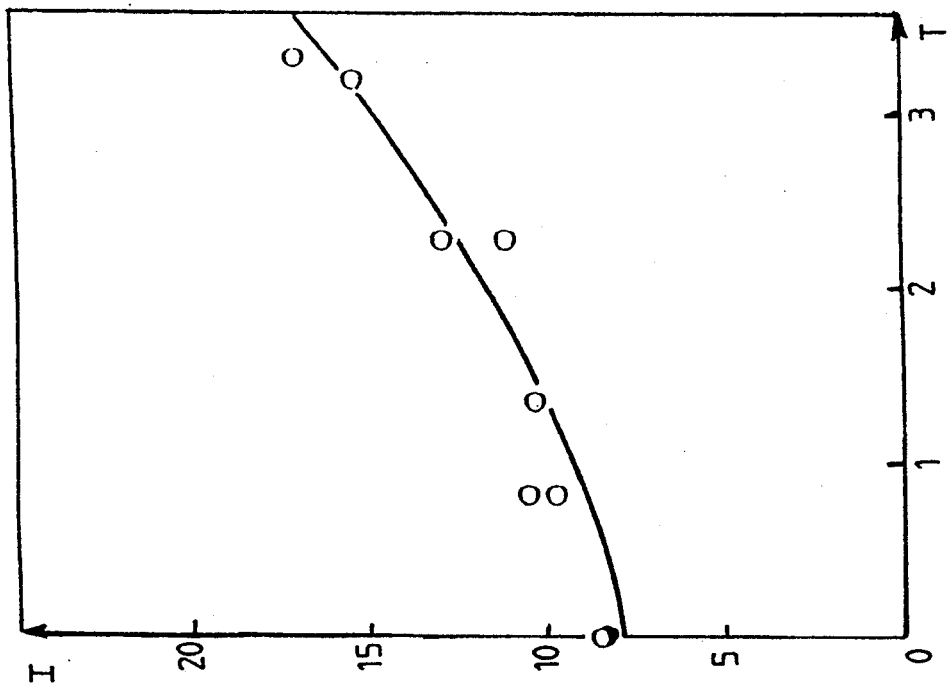
FIG. 1 shows the evolution of the intensity I of the 3730–3745 $cm^{-1}$ band of the aluminas stabilized by silicon as a function of the silicon content T.

A treatment under vacuum up to 500° C. of the alumina supports followed by an introduction of increasing silicon contents allows to make the following remarks in support of FIGS. 1 and 2.

On FIG. 2, $\beta$ represents the ratio of the intensity of the band due to the hydroxyl groups of alumina to the intensity of the band due to the hydroxyl groups of silicon.

FIG. 2 shows that the intensity of the characteristic OH bands of the hydroxyl groups of alumina decreases with the increase of the silicon content.

FIG. 1 shows that the intensity of the characteristic OH bands of the hydroxyl groups of silicon increases at the same time as the silicon content.

With silicon contents close to 3% by weight, the alumina support stabilized by the silicon exposes a surface essentially consisting of SiOH grouping. This result shows that the grafting of the tetraethoxysilicon compound leads to the formation of a monolayer of silicon strongly bound to the subjacent alumina.

Thus in accordance with recent theories concerning the sintering of alumina, the part of the silicon would be to block the migration of Al—OH species due to the concealment of the defects of the alumina with water which seems to be the most effective sintering agent.

Measurements of absorption of pyridine effected by infrared spectrometry show that the introduction of silicon on an alumina results in the appearance of a Brösted acid character. The created Si—OH silanol groups comprise sufficiently acid protons to convert the pyridine into a pyridinium ion. The initial alumina as well as a silica do not comprise hydroxyl groups presenting an acid character in the Brösted meaning. This observation shows that the grafting of the silicon on the surface of the; alumina deeply modifies the superficial properties of the alumina and that the silica thus dispersed has not the usual properties of this compound.

The introduction of a precursor of the active phase consisting of noble metals for the preparation of oxidation catalysts more resistant to thermal sintering has to take into account this evolution of the properties of the support and in particular of the appearance of a protonic acidity.

There has been carried out a study of the thermal stability of a support essentially of alumina and of a support essentially of alumina stabilized by silicon according to the method previously described.

The study of the thermal stability of the support also called aging test is performed in the presence of water at high temperature and in the following operating conditions:

support mass: 3 g
flow rate: 10 l/h
gaseous mixture: air+water (20% by volume)
temperature: 1,220° C.
duration of the test: 24 hours.

This study allows to measure the specific surface and to observe the type of crystalline phases present in supports of alumina modified or not modified by the silicon.

The table herebelow gathers the experimental results:

| % by weight of silicon | specific surface ($m^2/g$) after test of aging | observed crystalline phases |
|---|---|---|
| 0 | 4 | $\alpha$ |
| 1.97 $Si/mm^2$ | 8 | $\alpha + \theta$ |
| 2.9 $Si/mm^2$ | 30 | $\alpha + \theta$ |
| 3.16 $Si/mm^2$ double grafting | 50 | $\theta$ |
| 4.6 $Si/mm^2$ | 44 | $\theta$ |
| 6.85 $Si/mm^2$ double | 51 | $\theta$ |

| % by weight of silicon | specific surface (m²/g) after test of aging | observed crystalline phases |
|---|---|---|
| grafting | | |

Therefore the introduction of an increasing amount of silicon gradually stabilizes the support essentially of alumina.

B) Preparation of the catalysts

The essentially alumina-based support stabilized by the silicon then receives the precursor of the active phase. The addition of this precursor may be made through conventional impregnation or through cationic exchange.

1) Preparation of the catalyst through conventional impregnation

This preparation is carried out on a support essentially of SCM 129 alumina manufactured by RHONE-POULENC and on the same support stabilized by 3.16% by weight of silicon.

20 g of the support are put in suspension within about 200 ml of water. Under stirring, one casts an aqueous solution of the precursor of the active phase ($H_2PtCl_6$ or $H_2PdCl_4$) so as to obtain a noble metal content of the order of 2% by weight. One maintains the stirring for 12 hours at room temperature. The water is then removed under reduced pressure by using a rotary evaporator. The solids thus impregnated are dried at 110° C. for one night. They are then calcined under nitrogen up to 500° C. for a few hours and then reduced by a scavenging under hydrogen at the same temperature.

Through chemical analysis, one obtains the following noble metal contents:

| $Pt/Al_2O_3$ | 1.95% by weight of Pt |
|---|---|
| $Pt/Si—Al_2O_3$ | 2.03% by weight of Pt |
| $Pd/Al_2O_3$ | 1.98% by weight of Pd |
| $Pd/Si—Al_2O_3$ | 1.80% by weight of Pd | where
$Al_2O_3$ mentions the non-stabilized support
$Si—Al_2O_3$ mentions the support stabilized with 3.16% by weight of silicon.

2) Preparation of the catalyst through cationic exchange

The showing up of a protonic acidity in the case of a support essentially of alumina stabilized by silicon suggests to use the mobility of the protons bound to the OH groups for performing an exchange operation according to the scheme:

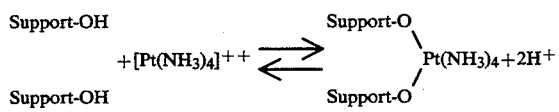

A semi-quantitative estimation of the acidity measurements shows that the, number of acid hydroxyl groups is relatively small. Their number does not allow to carry out an exchange according to the scheme hereabove for platinum or palladium contents higher than 0.5% by weight.

Moreover the cationic exchange operation may not be performed in the case of a support essentially of alumina non stabilized by the silicon. The pure alumina indeed does not have hydroxyl groups having an acid character according to Brösted.

The cationic amino-complex $[M(NH_3)_4]^{2+}$ where M is platinum or palladium is prepared by dissolving a known mass of corresponding chloride $MCl_2$ in concentrated ammonia in the vicinity of a temperature of 60° C. After the formation of the complex, the ammoniacal solution is added in drops at room temperature to a suspension of the $Si—Al_2O_3$ solid in concentrated ammonia. The system obtained is maintained under stirring for a few hours at the same temperature. The solid is then washed with water until vanishing of the chloride ions and is oven-dried at a temperature of 110° C. for one night. The $NH_3$ coordinates of the complex $[M(NH_3)_4]^{++}$ are then removed by a slow rise in temperature (0.5° C./mn) under scavenging with oxygen at 300° C., The active phase of the catalyst is obtained by a reduction under hydrogen at 500° C.

The noble metal contents of the support essentially of alumina stabilized by silicon are the following:

| $Pt/Si—Al_2O_3$ | 0.51% by weight of Pt |
|---|---|
| $Pd/Si—Al_2O_3$ | 0.56% by weight of Pd |

One will hereinafter describe the essential characteristics of the oxidation catalysts according to the invention in comparison with conventional catalysts.

The catalysts prepared according to the prior state of the art and according to the present invention are subjected to an accelerated aging test intended to appreciate the influence of a thermal sintering in the presence of water upon their catalytic activity. The conditions of the test are the following:
mass of catalyst: 3 grammes
flow rate of the reagents: 10 l/h
composition of the reagents by volume: 9% of methane in air (stoichiometric mixture)
temperature: 1,095° C.
duration: 24 hours.

At the end of the aging test a mass of 200 mg of aged catalyst is taken in order to measure the catalytic activity.

The measurement of the catalytic activity of the catalyst is carried out in the combustion reaction of methane. The operating conditions are the following:
mass of catalyst: 200 mg
flow rate of the reagents: 6.4 l/h
composition of the reagents by volume: $O_2$ (4%), $CH_4$ (1%), $N_2$ (95%).

The activity is measured every 25° C. in the range of temperature of the order from 250° C. to 800° C. At each temperature the duration of the test is of the order of 5 hours. The analysis of the products formed is effected through gaseous phase chromatography. The activity may be expressed by the rate of global transformation (T.T.G.) defined by the following relationship:

$$T.T.G. = (P_{CO} + P_{CO_2}/P_{CO} + P_{CO_2} + P_{CH_4}) \times 100,$$

where $P_i$ represents the partial pressure of the "i" compound in the gases flowing out of the reactor. The activity may also be expressed from the value of the T.T.G. and upon taking into account the flow rate of the reagents and the mass of catalyst in moles of methane converted into carbon dioxide per hour and per gramme of catalyst. To the extent where the catalysts have not the same noble metal content, one may norm the activity by expressing it in moles of methane converted into carbon dioxide per hour and per mole of introduced noble metal.

The catalytic activities measured before and after the aging test constitute a measurement of the resistance of the catalyst to a thermal sintering at high temperature and in the presence of water.

One will hereinafter detail some characteristics of the catalysts prepared according to the invention and according to the prior art.

1) Catalytic activity of the catalyst Pt/Al$_2$O$_3$ (1.95% by weight of Pt) of the prior art before and after accelerated aging The catalysts the support essentially of alumina of which is manufactured by RHONE-POULENC and which bears the reference SCM 129 are prepared by impregnation of the support with hexachloroplatinic acid (H$_2$PtCl$_6$).

Figure 3:
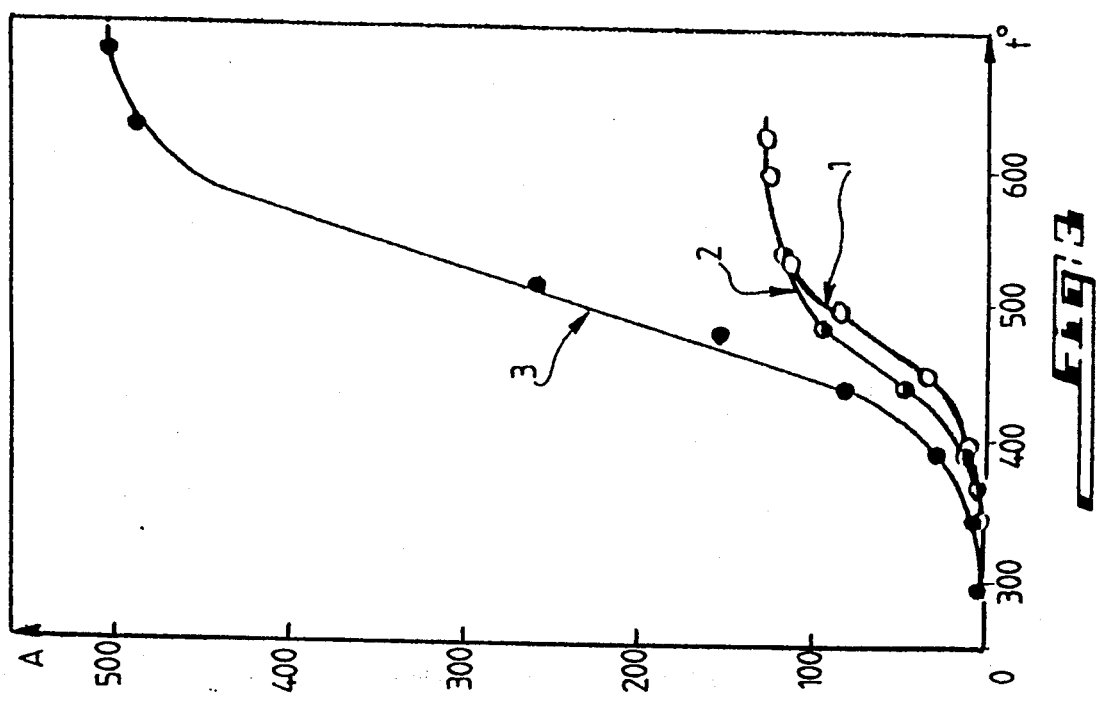
FIG. 3 shows the evolution of the catalytic activity A (in moles of $CH_4$ converted into carbon dioxide per hour and per mole of introduced platinum) as a function of the reaction temperature of the platinum-based catalysts prior to accelerated aging.

For the fresh catalyst, i.e. prior to the accelerated aging, represented by the curve 1 of FIG. 3, the characteristics are the following:
  the activity is developing from 300° C., the conversion is total at about 580° C.,
  the temperature of semi-conversion or T$_{50}$ is 480° C.

Figure 4:
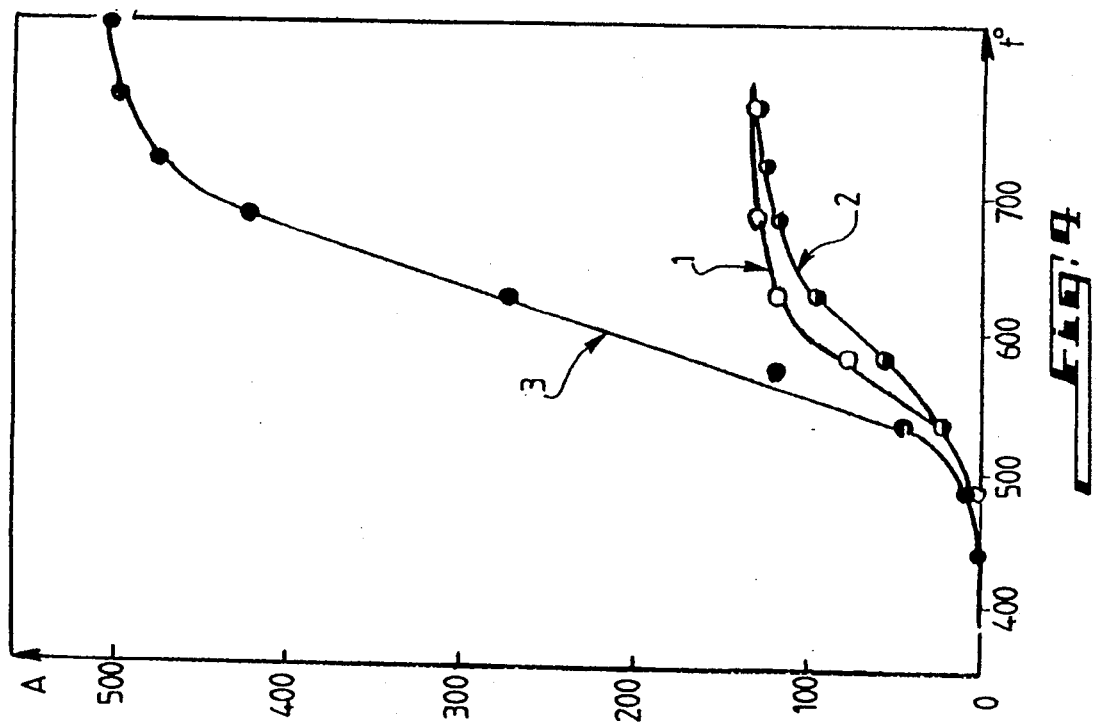
FIG. 4 shows the evolution of the catalytic activity A (in moles of $CH_4$ converted into carbon dioxide per hour and per mole of introduced platinum) as a function of the reaction temperature of the platinum-based catalysts after accelerated aging.

For the catalyst aged in an accelerated manner, represented on the curve 1 on FIG. 4, the characteristics are the following:
  the activity is measurable from 430° C., the conversion is total at about 720° C.,
  the temperature of semi-conversion T$_{50}$ is 570° C.,
  one remarks the absence of carbon monoxide,
  the specific surface of the catalyst is 10 m$^2$/g.

Figure 5:
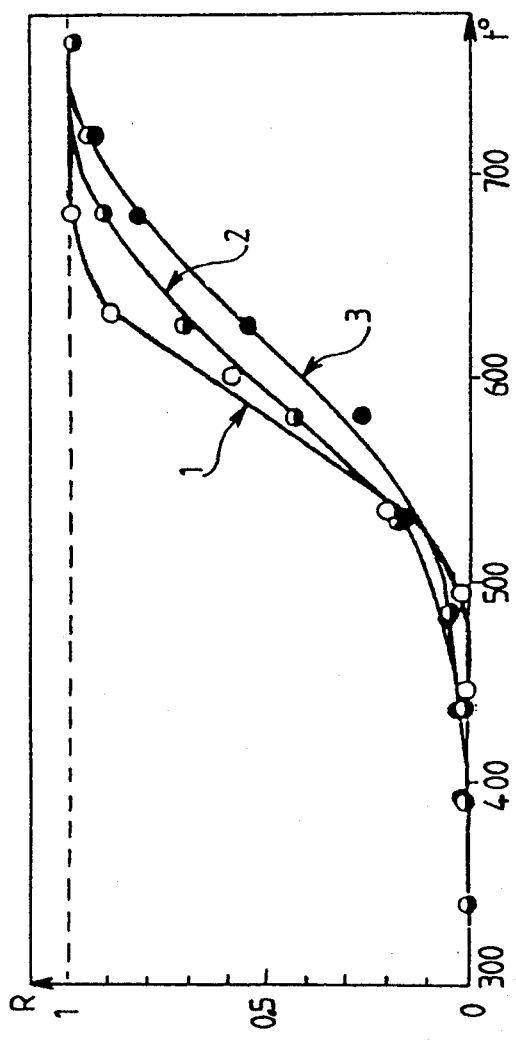
FIG. 5 shows the ratio R of the activities in the aged state and in the fresh state of platinum-based catalysts as a function of the reaction temperature.

One will remark from the curve 1 of FIG. 5 that at 600° C., the catalyst aged in an accelerated fashion retains 60% only of the activity of the fresh catalyst.

2) Catalytic activity of the catalysts Pd/Al$_2$O$_3$ (1.98% by weight of Pd) of the prior art before and after accelerated aging.

The catalysts the support essentially of alumina of which is manufactured by RHONE-POULENC and which bears the reference SCM 129 are prepared by impregnation of the support with tetrachloropalladic acid (H$_2$PdCl$_4$).

Figure 6:
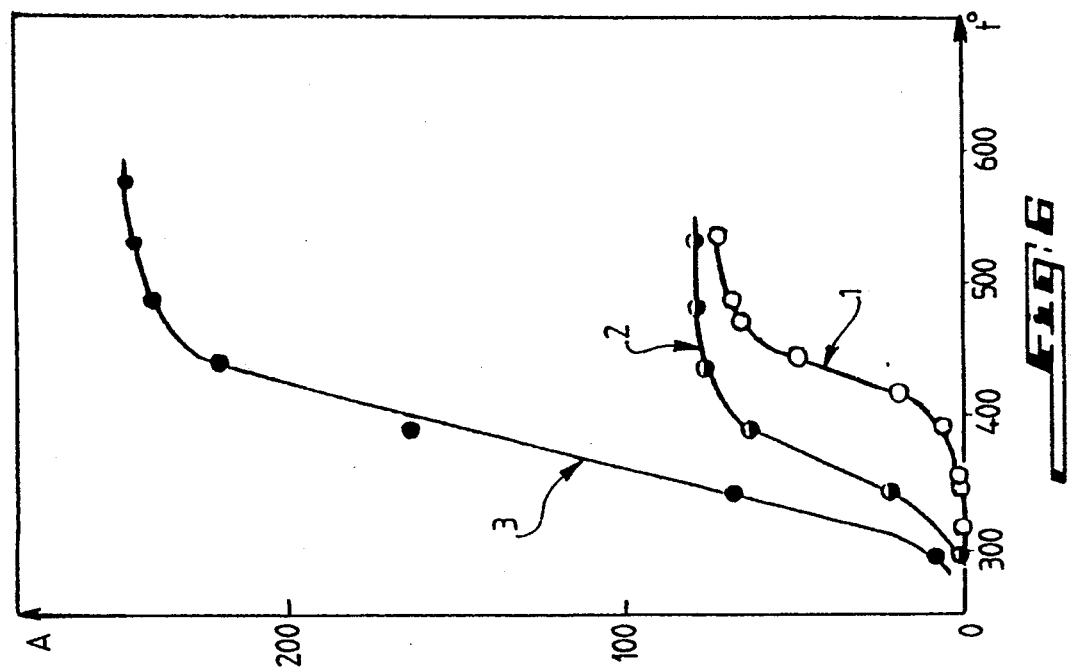
FIG. 6 shows the evolution of the catalytic activity A (in moles of $CH_4$ converted per hour and per mole of introduced palladium) as a function of the reaction temperature of the palladium-based catalysts in the fresh state.

For the fresh catalyst, represented by the curve 1 of FIG. 6, the characteristics are the following:
  the activity is measurable from 340° C. and the conversion is total at about 520° C.,
  the temperature of semi-conversion T$_{50}$ is 430° C.

Figure 7:
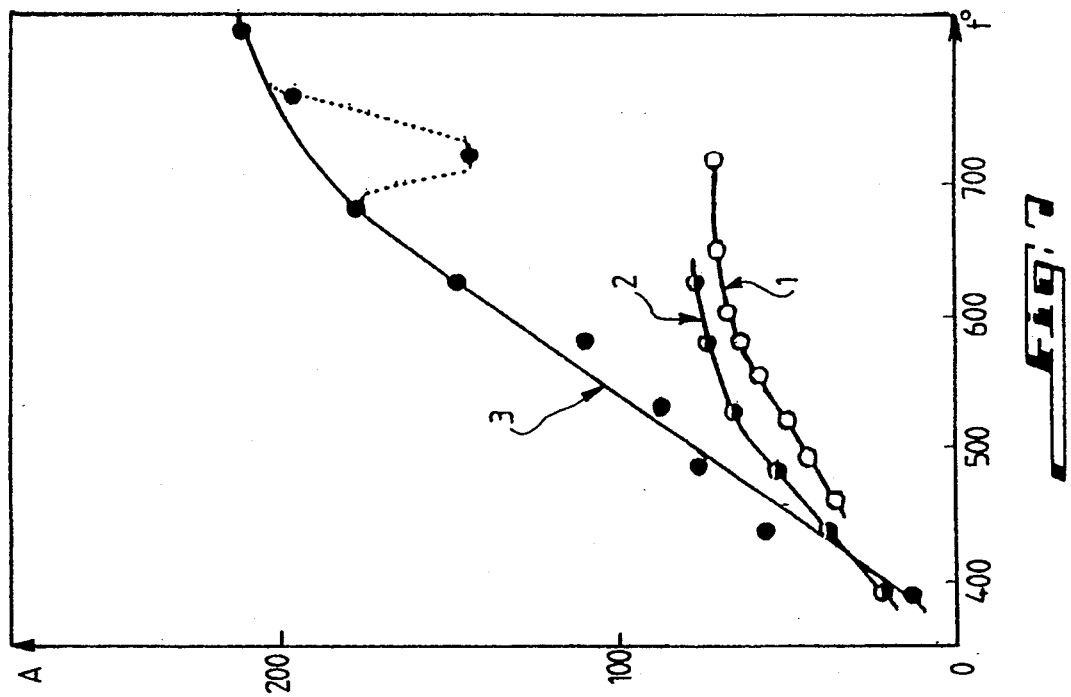
FIG. 7 shows the evolution of the catalytic activity A (in moles of $CH_4$ converted per hour and per mole of introduced palladium) as a function of the reaction temperature of the palladium-based catalysts in the aged state.

For the catalyst aged in an accelerated fashion, represented by the curve 1 of FIG. 7, the characteristics are the following:
  the activity is measurable from 300° C. and the conversion is total at about 700° C.,
  the temperature of semi-conversion T$_{50}$ is 460° C.
  The specific surface is 11 m$^2$/g.

Figure 8:
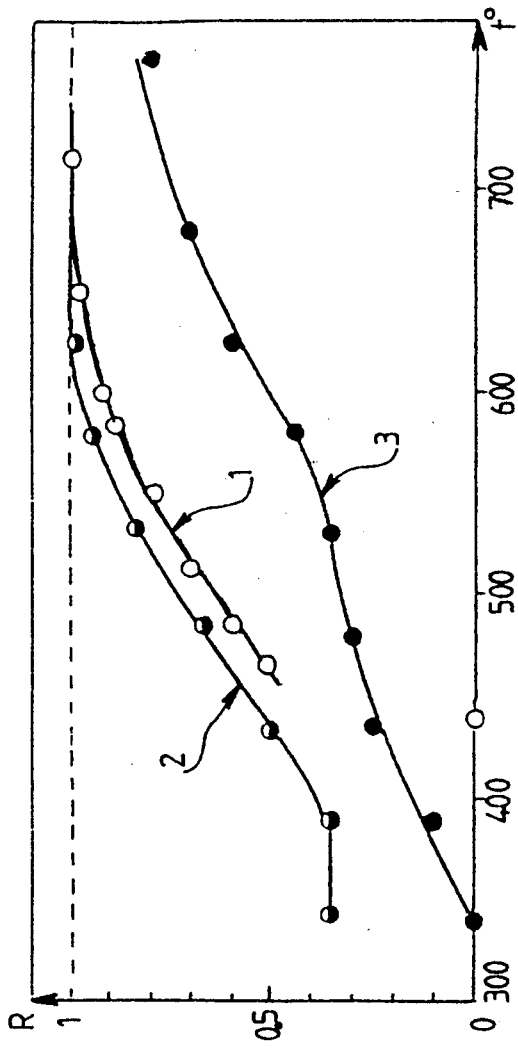
FIG. 8 shows the ratio R of the activities in the aged state and in the fresh state of palladium-based catalysts as a function of the reaction temperature.

From the curve 1 of FIG. 8, one remarks that at 600° C., the catalyst in the aged state retains about 90% of the activity of the fresh catalyst. The desactivation is less substantial than in the case of a platinum-based active phase deposited on the same support.

3) Catalytic activity of the catalysts Pt/Si—Al$_2$O$_3$ (2.03% by weight of Pt) according to the invention before and after accelerated aging.

One obtains the active phase of the catalysts having a support essentially of alumina stabilized by 3.16% by weight of silicon through conventional impregnation by means of hexachloroplatinic acid (H$_2$PtCl$_6$).

The essential characteristics of the fresh catalyst represented by the curve 2 of FIG. 3 are the following:
  the activity is measurable from 300° C., the conversion is total in the vicinity of 600° C.,
  the temperature of semi-conversion T$_{50}$ is 450° C.

According to FIG. 4 the essential characteristics of the aged catalyst represented by the curve 2 are the following:
  the activity is measurable from 450° C. and the conversion is total towards 750° C.,
  the temperature of semi-conversion T$_{50}$ is 590° C.,
  one does not observe the formation of carbon monoxide,
  the specific surface is 75 m$^2$/g.

According to the curve 2 of FIG. 5, at 600° C., the activity of the catalyst aged in an accelerated manner represents 55% only of the activity of the non-aged catalyst.

4) Catalytic activity of the catalysts Pt/Si—Al$_2$O$_3$ (0.51% by weight of Pt) according to the invention before and after accelerated aging.

One obtains the active phase of the catalysts having a support essentially of alumina stabilized with 3.16% of silicon by cationic exchange by using the complex [Pt(NH$_3$)$_4$]$^{++}$.

According to the curve 3 of FIG. 3, the essential characteristics of the fresh catalyst are the following:
  the activity is measurable from 250° C. and the conversion is total towards 650° C.,
  the temperature of semi-conversion T$_{50}$ is 500° C.

This catalyst is the most active one of the solids prepared with a platinum base. The activity per gramme of catalyst is comparable to those of the other systems although the platinum content be 3 to 4 times smaller.

According to the curve 3 of FIG. 4, the aged catalysts have the following characteristics:
  the activity is measurable from 400° C. and the conversion is total towards 750° C.,
  the temperature of semi-conversion T$_{50}$ is 612° C.,
  the specific surface is 75 m$^2$/g.

According to the curve 3 of FIG. 5, at 600° C. for example an activity corresponding to 40% of that of the initial catalyst is maintained.

5) Catalytic activity of the catalyst Pd/Si—Al$_2$O$_3$ (1.80% by weight of Pd) according to the invention before and after accelerated aging.

One obtains the active phase of the catalysts having a support essentially of alumina stabilized with 3.16% of silicon by conventional impregnation by means of tetrachloropalladic acid (H$_2$PdCl$_4$).

According to the curve 2 of FIG. 6, the catalysts have the following characteristics:
  the activity is measurable from 250° C., the conversion is total in the vicinity of 480° C.,
  the temperature of semi-conversion T$_{50}$ is 360° C.

The catalyst Pd/Si—Al$_2$O$_3$ is definitely more active in all the ranges of temperatures studied than the known system $Pd/Al_2O_3$ using the same precursor of the active phase.

According to the curve 2 of FIG. 7, the aged catalyst has the following characteristics:
- the activity is measurable from 250° C. and the conversion is total in the vicinity of 650° C.,
- the temperature of semi-conversion $T_{50}$ is 440° C.,
- the specific surface is 75 m²/g.

The activity of the catalyst is higher than that of the known system $Pd/Al_2O_3$ using the same precursor of the active phase.

According to the curve 2 of FIG. 8, at 600° C. for example, the aged catalyst retains an activity equal to that of the fresh catalyst. The accelerated aging has no effect upon the catalytic activity at this temperature.

The catalyst performs the oxidation of methane while leading exclusively to the formation of carbon dioxide (absence of carbon monoxide) and this whether or not in the aged state.

6) Catalytic activity of the catalysts $Pd/Si—Al_2O_3$ (0.56% by weight of Pd) according to the invention before and after accelerated aging.

One obtains the active phase of the catalysts having a support essentially of alumina stabilized with 3.16% of silicon by a cationic exchange by using the complex $[Pd(NH_3)_4]^{++}$.

According to the curve 3 of FIG. 6, the essential characteristics of the fresh catalyst are the following:
- the activity is measurable from 250° C. and the conversion is total towards 550° C.,
- the temperature of half-conversion $T_{50}$ is 380° C.

The activity per mole (or per gramme) of introduced methane is equal to about 3 or 4 times those of the other catalysts prepared on a palladium basis. It results therefrom that the activity of this catalyst per gramme of solid is comparable with those of the other systems although the metal content be 3 to 4 times smaller.

According to the curve 3 of FIG. 7, the aged catalysts have the following characteristics:
- the reaction starts towards 250° C. and the half-conversion ($T_{50}$) is obtained at a temperature of 580° C.,
- the specific surface is 75 m²/g.

This solid is the most active one of the aged catalysts. According to the curve 3 of FIG. 8 at 600° C. for example, an activity equal to 50% of the initial activity is maintained.

All the catalysts prepared according to the present invention perform the oxidation of the methane without evolving carbon monoxide, whether it is or is not in the aged state.

As this appears from the foregoing, the catalysts of the present invention exhibit a gain in activity especially perceptible at the low reaction temperatures, even though the catalysts using as a support alumina stabilized with silicon have not an improved thermal behaviour over all the range of temperature at the end of the aging test.

This gain in activity of the catalyst according to the invention entails a lifetime increased with respect to the conventional catalysts consisting of an alumina support non stabilized with silicon and on which the active phase is deposited.

The catalysts according to the invention allow to achieve a saving of noble metals and the possibility of lowering the palladium and platinum content for a catalytic activity per gramme of catalyst comparable to those of the known catalysts.

The invention is of course not at all limited to the embodiments described which have been given by way of illustration only.

We claim:

1. A non-selective oxidation catalyst consisting of an alumina support stabilized with silicon grafted on alumina and a precursor of the active phase consisting of a noble metal M, said precursor being an amino-complex of the $[M(NH_3)_4]^{++}$ type.

2. Catalyst according to claim 1, wherein said silicon grafted on said alumina is tetraethoxysilicon.

3. Catalyst according to claim 1, characterized in that the noble metal M is palladium or platinum.

4. Catalyst according to claim 1, characterized in that the noble metal content is between 0.1% and 1% by weight based on the final weight of the catalyst.

5. Catalyst according to claim 1, characterized in that the noble metal content is about 0.5% by weight based on the final weight of the catalyst.

6. A method of preparing a catalyst of claim 1, comprising stabilizing an alumina support with silicon and thereafter subjecting the stabilized support to cationic exchange with an amino-complex of the $[M(NH_3)_4]^{++}$ type where M is a noble metal.

7. A non-selective oxidation catalyst consisting of an alumina support stabilized with silicon and of a precursor of. platinum or palladium, said precursor being an amino-complex of the $[M(NH_3)_4]^{++}$ type wherein M is palladium or platinum.

8. The method of claim 6, wherein M is platinum or palladium.

* * * * *